G. W. TUCKER.

Assignor to THE AMERICAN RING CO.

Umbrella-Handle.

No. 8,426. Reissued Sept. 24, 1878.

Attest:
Courtney A. Cooper
Frank McGreen

Inventor.
G. W. Tucker
By his atty
Charles E. Foster

N. PETERS, PHOTO-LITHOGRAPHER, WASHINGTON, D. C.

UNITED STATES PATENT OFFICE.

GEORGE W. TUCKER, OF WATERBURY, CONNECTICUT, ASSIGNOR TO THE AMERICAN RING COMPANY, OF SAME PLACE.

IMPROVEMENT IN UMBRELLA-HANDLES.

Specification forming part of Letters Patent No. 160,627, dated March 9, 1875; Reissue No. 8,426, dated September 24, 1878; application filed September 12, 1878.

DIVISION B.

*To all whom it may concern:*

Be it known that I, GEORGE W. TUCKER, of Waterbury, New Haven county, Connecticut, have invented an Improvement in Handles for Umbrellas, Parasols, &c., of which the following is a specification:

Various devices have been used for handles, such as pearl, ivory, and bone. These are liable to split and break under exposure to moisture, sunlight, or concussion. The pearl, which makes a very handsome handle, is especially liable to injury, and, beside this, is very expensive.

My improvement consists in a handle which is made of sheet metal in imitation of pearl, and which, while equal or nearly so in appearance to actual pearl, is not injured by the moisture, heat, or handling incident to the use of an umbrella, parasol, or whip; and this handle is strong and durable, and becomes a new article of manufacture.

I make use of an ordinary stock or stick to form the foundation for the ornamental surface, and upon this a tube of sheet-tin is placed, said tube being either parallel, tapering, or prismatic, and this tube is ornamented upon its surface by the granulated or crystalline character of the tin being developed by an etching and coloring process previous to varnishing the same. This prepared tin is sometimes called "*moire metallique*," and the varnish applied to the same is to be such as to imitate the color of pearl. The handle made in this manner is superior to pearl in durability, and the appearance thereof in the tubular form almost as handsome as that of pearl. The handle made in this manner is a new article of manufacture.

Figure 1:
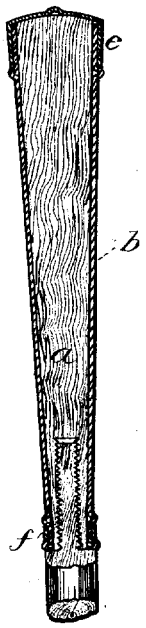
Figure 2:
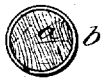

In the drawing I have shown the handle by a longitudinal section, Figure 1, and a cross-section, Fig. 2.

The wooden stick or handle-stock *a* is of the desired size and shape, and is preferably made tapering, as shown. Upon this wooden stick the sheet-metal tube *b* is applied, said tube being of crystallized tin-plate, colored and varnished in imitation of pearl; and this may be rolled up from a flat sheet and soldered at the ends of the joint; and I prefer and use the tip-cap *e* of metal to inclose the end of the stick *a* and also of the tin-plate tube *b*, and a band, *f*, should be used around the other end of the tube *b* to form an ornament and also to hold the crystallized tin-plate tube in place.

I claim as my invention—

As a new article of manufacture, the handle for umbrellas, parasols, or whips made of crystallized tin-plate varnished in imitation of pearl, substantially as and for the purpose set forth.

In testimony whereof I have signed my name to this specification in the presence of two subscribing witnesses.

G. W. TUCKER.

Witnesses:
C. E. FOSTER,
COURTNEY A. COOPER.